US005593163A

United States Patent [19]

Daiber et al.

[11] Patent Number: 5,593,163

[45] Date of Patent: Jan. 14, 1997

[54] DIFFERENTIAL PRESSURE ACCUMULATOR

[75] Inventors: Paul C. Daiber, Ballston Lake; William L. Bird, Jr., Scotia, both of N.Y.

[73] Assignee: General Electric Co., Schenectady, N.Y.

[21] Appl. No.: 408,501

[22] Filed: Mar. 21, 1995

Related U.S. Application Data

[62] Division of Ser. No. 266,815, Jun. 27, 1994, Pat. No. 5,474,304.

[51] Int. Cl.[6] .............................. F16J 15/00; F16L 55/04

[52] U.S. Cl. .............................. 277/3; 138/31

[58] Field of Search .............................. 277/3, 15, 17, 277/103; 138/30, 31

[56] References Cited

U.S. PATENT DOCUMENTS

| | | | |
|---|---|---|---|
| 3,176,996 | 4/1965 | Barnett | 277/3 |
| 3,942,323 | 3/1976 | Maillet . | |
| 4,005,580 | 2/1977 | Swearingen . | |
| 4,031,704 | 6/1977 | Moore et al. | 417/379 |
| 4,058,320 | 11/1977 | Kosanovich . | |
| 4,492,528 | 1/1985 | Bentley | 417/241 |
| 4,551,079 | 11/1985 | Kain | 418/26 |
| 4,905,502 | 3/1990 | Gram | 73/167 |

FOREIGN PATENT DOCUMENTS

| | | |
|---|---|---|
| 930334C | 7/1955 | Germany . |
| 1962246A | 6/1971 | Germany . |
| 55-126162 | 9/1980 | Japan . |
| 2093533 | 9/1982 | United Kingdom . |

*Primary Examiner*—Daniel G. DePumpo
*Attorney, Agent, or Firm*—Nixon & Vanderhye

[57] ABSTRACT

In a seal oil system utilized to supply oil to shaft seals of a generator for preventing pressurized gas inside the generator from escaping through an interface of the generator shaft and the generator frame, wherein seal oil is supplied to said seals via a main supply line at a predetermined pressure, the improvement comprising at least one differential pressure accumulator including a barrel having an upper inlet end and a lower outlet end, and a piston slidably mounted in said barrel and movable between said inlet end and said outlet end; a first chamber above said piston having liquid supplied thereto at a pressure equal to internal gas pressure of the generator; a second chamber below said piston charged with generator seal oil; and means for enabling said at least one accumulator to discharge generator seal oil to said main supply line upon temporary decrease in pressure in said main supply line.

10 Claims, 3 Drawing Sheets

DIFFERENTIAL PRESSURE ACCUMULATOR

This is a divisional of application Ser. No. 08/266,815 filed on Jun. 27, 1994, now U.S. Pat. No. 5,474,304.

TECHNICAL FIELD

This invention relates generally to generator seal oil systems and specifically, to a unique differential pressure accumulator arrangement for use in an emergency pump activation circuit in such systems.

BACKGROUND PRIOR ART

Free piston type accumulators are not in and of themselves new, and the utilization of such accumulators in hydraulic systems is well known. Nevertheless, the present invention provides a new accumulator design especially designed for a new use within the context of a generator seal oil system.

Demanding requirements for safety, reliability and maintainability in power stations with relatively low differential pressure generator seal oil systems mandate protection schemes designed to maintain the integrity of single radial oil film gas seals applied to large steam turbine generators or gas turbine generators which are hydrogen cooled. The need for additional protection against transient disruptions of oil pressure to the air/hydrogen seal rings is occasionally driven by customer requirements and customer failure criteria that are more demanding than has been established by general industry practice and operating experience. This is particularly true since, in the event of seal failure, pressurized hydrogen inside the generator can escape through the frame/shaft interface possibly creating an explosive mixture outside the generator. Moreover, when a hydrogen leak occurs, the leaking seal does not reestablish itself until the generator is substantially degassed.

The present invention provides an accumulator design which is specifically tailored for inclusion in a generator seal oil system which includes a standby emergency seal oil pump. The accumulator is designed to maintain a minimum differential pressure across the generator seals at the required oil flow rate during a momentary reduction or interruption of supply oil flow.

DISCLOSURE OF THE INVENTION

In accordance with this invention, a vertically oriented, weighted piston type accumulator is provided in a generator seal oil system with direct generator gas pressure feedback to maintain a minimum differential seal oil pressure across the seals during a transient event, such as an incorrect valve operation by human error, failure of the differential pressure regulating valve, or mechanical failure of a single running main supply pump, motor, or coupling.

Generators typically employ seals at opposite ends of the generator where the rotor shaft exits the generator frame in order to prevent internal hydrogen gas from escaping to atmosphere along the shaft. In a typical arrangement, a set of four seals are used at each end, two for sealing air and two for sealing hydrogen. These seals are maintained by an oil film, with oil being injected in the center of the seal assembly and then directed to the air and hydrogen seal components. Of particular concern here are the hydrogen seals.

Rather than using a pre-pressurized gas to push against a piston or to inflate a bladder as in a conventional accumulator design, a large bore sensing line filled with oil from the hydrogen (seal) detraining tank is used to provide direct generator gas pressure feedback to the upper side of a free piston in the vertically oriented accumulator. In other words, since oil drains from the hydrogen seals at a pressure equal to the internal generator gas pressure to one or more hydrogen detraining tanks, we have discovered that the hydrogen detraining tank oil pressure can be used, in combination with the weight of the accumulator piston, to provide direct generator pressure feedback to maintain a relatively fixed differential seal oil pressure during a transient event when main seal oil supply pressure is inadequate.

More specifically, the piston mass density, diameter and length are selected to account for the desired differential pressure, the differences in elevation of the hydrogen detraining tank and seal rings, the pressure drop due to friction in the interconnecting pipes, valves and orifices, the effects of piston seal ring dynamic friction, and the overall dynamics of the system. The piston seal ring material is also selected to minimize the effect of static friction. The proposed approach is particularly useful at lower differential pressures with relatively small changes in differential pressure allowed for the successful operation of a generator seal oil system.

Accordingly, in an exemplary embodiment, the present invention includes an accumulator having a cylinder or barrel with a smooth cylindrical inside surface, end caps providing an inlet and outlet at opposite ends of the barrel, and a piston slidable in opposite directions within the barrel. The barrel is also provided with damping means on either side of the piston in order to provide a soft impact as the piston travels to its limits in opposite directions within the barrel. In the exemplary embodiment, the piston component is formed by a solid cylindrical body and a plurality of discrete disks secured to the body. In this way, the weight of the piston can be altered by adding/removing disks, and the accumulator calibrated accordingly.

The accumulator also includes a gas bypass arrangement, allowing gas in the accumulator (when empty, prior to charging with oil) to bypass a piston seal and escape through the upper end of the accumulator as the chamber below the piston is filled with seal supply oil and as the piston is moved upwardly toward the top of the accumulator.

In the exemplary embodiment described herein, two pair of differential pressure accumulators as described above are located downstream of an oil supply pump(s), and associated pressure regulating valve(s). The accumulators, all in a vertical orientation, are arranged so that the outlets at the lower ends thereof connect to the oil supply lines upstream of the generator seals. Specifically, two accumulators supply emergency seal oil to one set of seals at one end of the generator and two other accumulators supply emergency seal oil to the other set of seals at the opposite end of the generator. The second accumulator in each set increases system reliability (redundancy) and provides additional flow capacity when both accumulators are available.

As already mentioned above, oil from the hydrogen detraining tank or tanks is supplied to the upper chambers of the accumulators, while seal oil from the main supply is supplied to the lower chambers of the accumulators. In normal circumstances, the pressure differential within the accumulators is such that the pistons are moved to the upper portions of the accumulators with the lower chambers fully charged with seal oil.

If the seal oil supply should be interrupted by a transient event such as reduction or loss of oil flow due to incorrect valve operation by human error, differential pressure regulator valve failure, or mechanical failure of a single running main supply pump, the available oil flow and pressure in the seal oil supply line drops, the pump discharge pressure falls to zero and pressure in the seal supply line drops. As a result, the pistons within the accumulators fall, thus supplying seal oil to the main supply lines and maintaining a differential pressure of, for example, approximately 5½ psid across the sets of generator seals until the accumulators are discharged. Thus, flow and pressure at the generator seals are maintained for a period of time sufficient for the main pump to recover, the emergency pump to start, or for the secondary differential pressure regulator to assume control.

Upon resumption of the supply system pressure and flow, oil is again available to fill the accumulators, causing the pistons to rise to the top of the cylinders or barrels to the fully charged condition.

It will be appreciated that the system application described herein is exemplary only and is not intended as limiting the scope of the invention. For example, it is not necessary that four accumulators be utilized to supply emergency oil to two sets of seals. Such redundancy may be required, however, in any systems where safety is a principal concern. It will also be appreciated that the accumulator design has applicability to other systems as well.

Thus, in accordance with one aspect of the invention, there is provided a seal oil system utilized to supply oil to shaft seals of a generator for preventing pressurized gas inside the generator from escaping through an interface of the generator shaft and the generator frame, wherein seal oil is supplied to the seals via a main supply line at a predetermined pressure above internal gas pressure of the generator, the improvement comprising at least one differential pressure accumulator including a barrel having an upper inlet end and a lower outlet end, and a piston slidably mounted in the barrel and movable between the inlet end and the outlet end; a first chamber above the piston having liquid supplied thereto at a pressure approximately equal to the internal gas pressure of the generator; a second chamber below the piston charged with generator seal oil; and means for enabling at least one accumulator to discharge generator seal oil to the main supply line upon temporary decrease in pressure in the main supply line.

In accordance with another aspect, the invention relates to an oil supply system for first and second shaft seal sets at opposite ends of a generator wherein each shaft seal set includes an air seal and a hydrogen seal and wherein each seal set is pressurized by oil supplied by a pump via first and second main conduits, respectively, at a predetermined pressure above internal gas pressure of the generator; at least a pair of differential pressure accumulators, each having a barrel with an inlet at an upper end thereof and an outlet at a lower end thereof, and a piston slidably mounted on the barrel to provide an upper chamber in communication with the inlet and a lower chamber in communication with the outlet; the outlet of one of the accumulators arranged to supply seal oil to one of the main supply conduits and the outlet of the other of the accumulators arranged to supply seal oil to the outer of the main supply conduits; the inlets of both of the accumulators arranged to receive oil drained from the first and second seal sets at a pressure approximately equal to internal gas pressure of the generator.

In still another aspect, the invention relates to a differential pressure accumulator for use in an oil supply system and adapted to temporarily supply oil to a destination during a transient event, the accumulator comprising a barrel having an inlet at one end and an outlet at the other end; a piston slidably received within the barrel to provide upper and lower chambers on opposite sides of the piston, wherein the piston comprises a body portion extending approximately one half the length of the piston, secured to a plurality of axially aligned disks extending over the other half of the length of the piston such that weight of the piston can be altered by addition or removal of one or more of the disks.

In still another aspect, the invention relates to an oil supply system for first and second shaft seal sets at opposite ends of a generator wherein each shaft seal set includes an air seal and a hydrogen seal and wherein each seal is pressurized by oil supplied by a pump via first and second main conduits, respectively, at a predetermined pressure above internal gas pressure of the generator; and means for temporarily supplying seal oil to the first and second shaft seal sets upon a decrease in the predetermined pressure as a function of generator internal gas pressure.

Advantages of the differential pressure accumulator arrangement in accordance with this invention, and in the context of a generator seal oil system, are as follows:

(a) elimination of potential safety hazard for bleeding gas into the seal oil in the event of bladder rupture or failure of a gas/liquid seal in a conventional piston accumulator;

(b) elimination of the uncertainty of bladder dynamics with very small changes in working pressure compared to typical application of accumulators in hydraulic control circuits;

(c) automatic adjustment for changes in generator gas pressure in that the system does not require operator intervention to reset pre-charge pressure if the generator gas pressure is intentionally or unintentionally reduced;

(d) a more compact arrangement than conventional gas/liquid accumulators for the same working displacement. Specifically, there is more than a 10:1 improvement in volumetric efficiency for this application, compared to conventional bladder type accumulators;

(e) reduction and supply cost due to reduced number of devices of similar volumes and weights; and (f) an increase in reliability due to lower part count and the elimination of bladders and other gas/liquid interfaces.

Additional objects and advantages of the invention will become apparent from the detailed description which follows.

BEST MODE FOR CARRYING OUT THE INVENTION

Figure 1A:
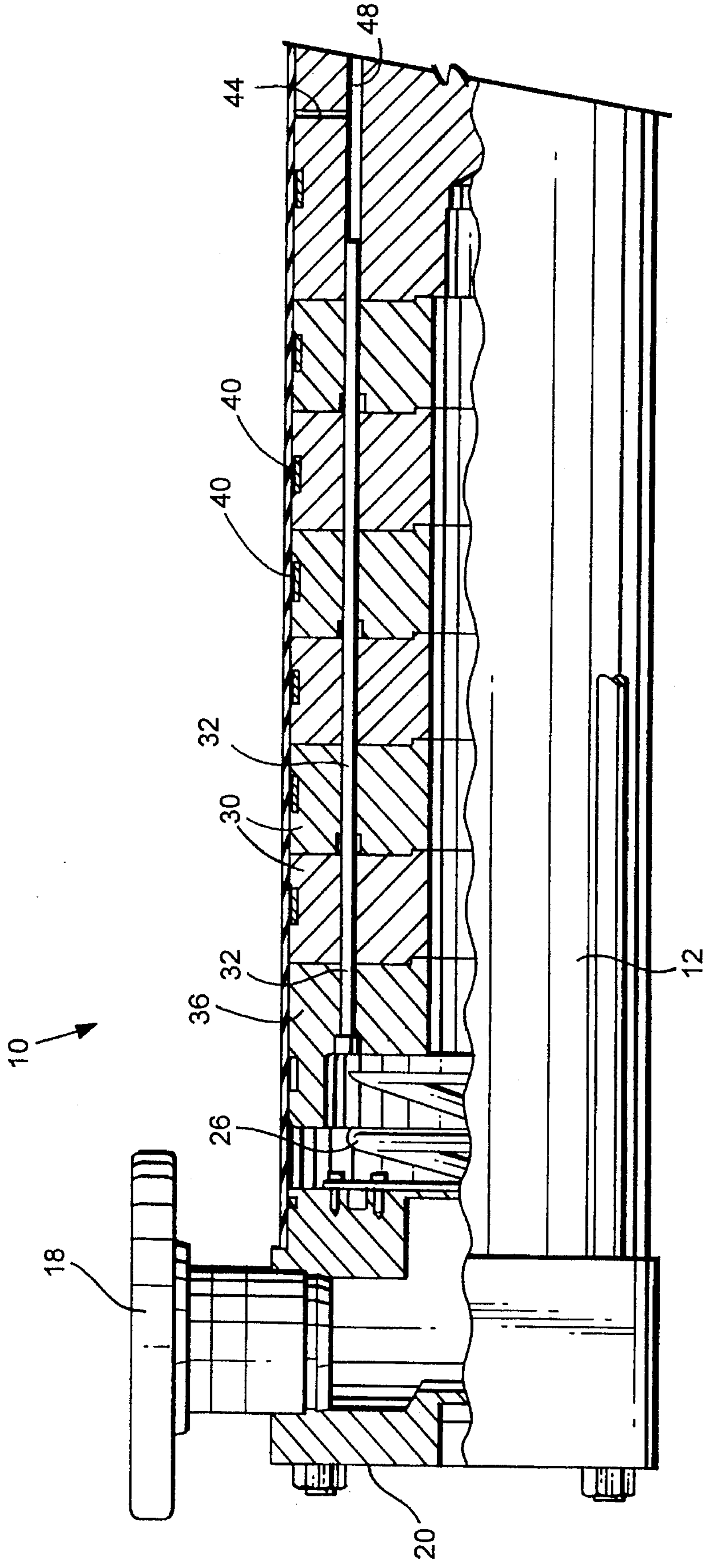
FIGS. 1A and 1B are split cross sections of a differential pressure accumulator in accordance with the invention.
Figure 1B:
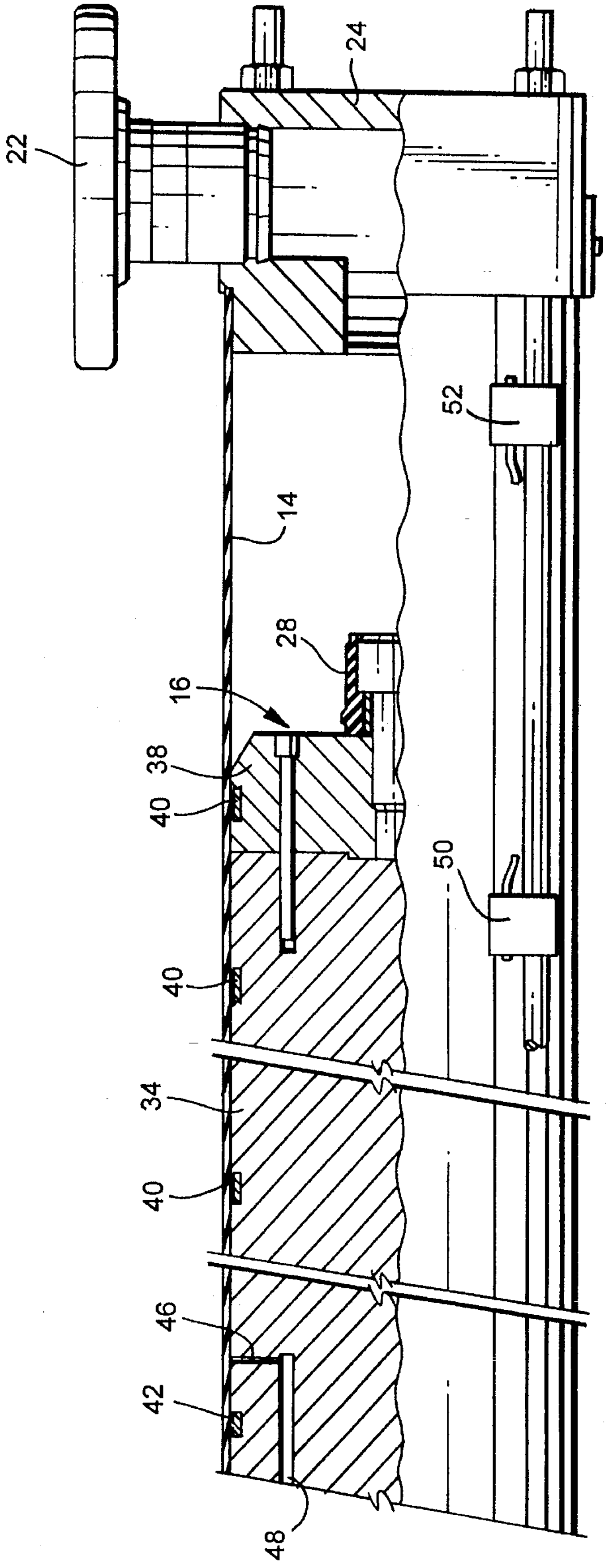

FIG. 1 illustrates a preferred differential pressure accumulator 10 in accordance with the invention. The accumulator includes a cylinder or barrel 12 formed from a non-magnetic material such as aluminum or stainless steel, having a smooth, cylindrical inside surface 14. A piston 16 is slidable within the barrel 12, with direction of movement dependent on pressures on opposite sides of the piston.

The barrel 12 is provided with an inlet 18 in one end cap 20 at one end of the barrel, and an outlet 22 in another end cap 24 at the opposite end of the barrel. In the preferred vertical orientation, the inlet 18 is located at the upper end, and the outlet 22 at the lower end of the accumulator.

If necessary or desired (depending on the specific application) mounting flanges (not shown) may be welded to one or both of the end caps 20, 24, but it will be appreciated that the accumulator may be mounted by the lower extension of the associated tie rods. As shown in FIG. 1, a coil spring 26 is provided within the barrel 12 between the piston 16 and the upper end cap 20. A "floating" cushion spear 28 is secured to the lower side of the piston 16, and it will be appreciated that spring 26 and cushion 28 are designed to provide a soft impact as the piston travels to the opposite end caps 20, 24 so as to dampen pressure spiking and prevent damage to the accumulator.

The piston 16 itself is made up of a series of carbon steel disks 30 secured together by bolts 32 or other suitable fastening means. The majority of piston 16 is comprised of a solid carbon steel body 34. These components (disks 30 and body 34) are sandwiched between upper and lower piston end disks 36, 38, all of which have substantially identical diameters. Each disk 30, as well as end disks 36, 38 includes an annular wear band 40 (e.g., carbon filled Teflon®) which facilitates sliding motion of the piston disk components within the barrel, as well as the addition or removal of one or more of the disks 30 as described further below.

In an exemplary embodiment, the barrel or cylinder 12 may have a bore length of approximately five (5) feet, and a diameter of about six (6) inches. The piston 16 may have an axial length of approximately fifteen (15) inches, and a usable oil volume of about two (2) gallons. The working volume can be increased by reducing the number of carbon steel disks 30, with a corresponding reduction in differential pressure. The maximum flow rate through the accumulator may range from 25 to 50 gallons per minute, depending on oil temperature and the number of devices in service.

Approximately midway between the piston ends, a single annular T-seal 42 (FIG. 1B) is provided to separate the fluid on either side of the piston. A piston gas bypass or vent is also provided which includes radially drilled holes 44 and 46 and interconnecting axial hole 48 which allows gas to bypass the seal 42 from the high pressure to the low pressure side of the piston during charging of the accumulator. It will be understood that other piston seal and bypass arrangements may be incorporated into the piston structure.

Position sensors 50, 52, e.g., Hall effect sensors, may be located as best seen in FIG. 1. One of the sensors indicates when the accumulator is fully charged, the other when fully discharged.

In a normal operating mode, as described further below, seal supply oil occupies the interior space in the barrel 12 below the piston 16 while hydrogen detraining tank oil occupies the interior space above the piston. Under normal conditions, oil is supplied to the generator seals at about 8 psid over the generator internal gas pressure (45 to 65 psig). The piston 16 itself is sized and weighted to rise to the upper end cap or stopper 20 at the inlet end of the barrel for an oil pressure difference slightly above a specific, predetermined value (e.g., 6 psid). If the oil pressure differential drops below that specific value, the piston 16 will fall, and thus provide oil to the seal oil supply circuit at a pressure of about 5½ psid to thus maintain seal integrity for a period of time sufficient to bring a backup or emergency pump on line. The utilization of separable disks 50 permits precise calibration of the accumulator piston 16 in that the weight (mass density) length and diameter of the piston are selected which, when added to the generator gas pressure, develops a desired differential pressure in the accumulator.

Figure 2:
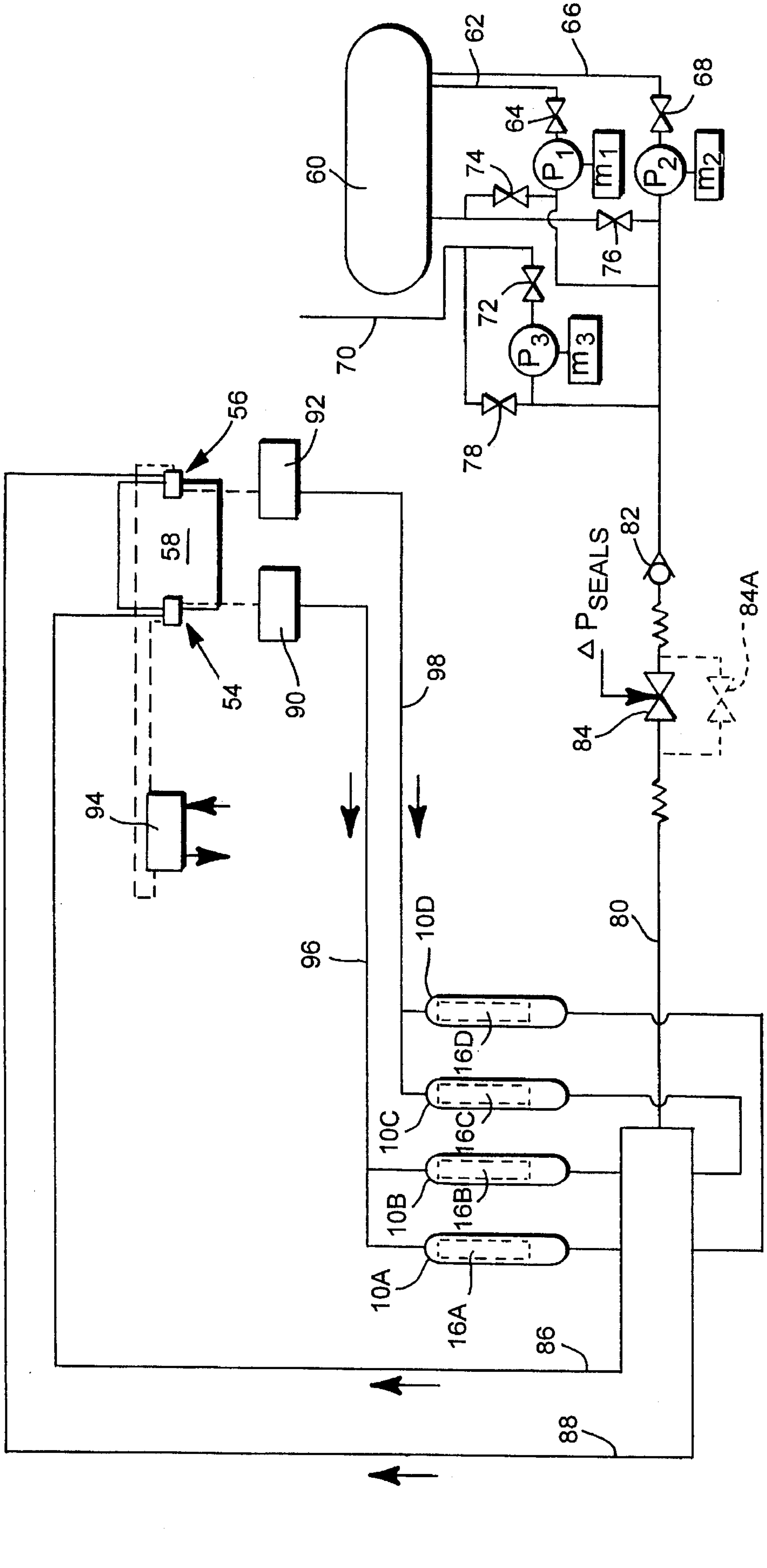
FIG. 2 is an exemplary but simplified schematic diagram of a seal oil system utilizing differential pressure accumulators as shown in FIG. 1.

FIG. 2 illustrates a system application for the accumulator 10 shown in FIG. 1. In FIG. 2, four such accumulators 10 (labelled 10A–10D) are shown in a simplified seal oil supply circuit for generator seals 54, 56 at opposite ends of a generator 58. The seal oil is supplied by a pump $P_1$ which draws oil from a tank 60 via conduit 62 and pump inlet valve 64. A second supply pump $P_2$ may or may not be running, depending on the maintenance status of the unit. Emergency pump $P_3$ is normally in the standby mode, with the dc motor field continuously energized for rapid start. The emergency pump preferably draws oil from a separate source, such as the lubrication oil system (not shown) via conduit 70. Relief valves 74, 76, and 78 are provided for the pumps $P_1$, $P_2$ and $P_3$, respectively.

The above described pumps are adapted to supply seal oil to the main supply line 80 via check valve 82 and one or more regulator valves 84. The valve 84 and/or backup 84A are calibrated to supply seal oil to seal sets 54, 56 via conduits 86, 88 at a predetermined pressure above the gas pressure inside the generator 58, for example, 8 psid during normal operating conditions.

It should be noted here that each seal 54, 56 is in reality a set of two oil film seals, the outer of which is an air seal and the inner of which are gas (hydrogen) seal. In a typical arrangement, oil under pressure drains from the gas seals on either side of the generator 58 to hydrogen detraining pipe enlargements or tanks 90, 92, while air from the air seals is passed to an air detraining pipe enlargement 94. Additional details of the conventional hydrogen and air detraining equipment (such as float traps, oil drain lines, etc.) and other system details have been omitted for the sake of clarity and are otherwise not part of this invention.

It will be appreciated that the oil discharge pressure to tanks 90, 92 is approximately equal to the generator internal gas pressure. In the exemplary embodiment shown, oil from detraining tank 90 is supplied to accumulators 10A, 10B via conduit 96 while oil from detraining tank 92 is supplied to accumulator 10C and 10D via conduit 98. The accumulators 10A, 10B, 10C and 10D are located downstream of the regulating valve(s) 84 (84A), with accumulator outlets 22A and 22B supplying seal oil to the conduit 86 while accumulators outlets 22C and 22D supply seal oil to the conduit 88 under emergency conditions described below. In other words, the accumulators 10A and B are plumbed in parallel with the supply line for seal 54 while accumulators 10C and 10D are plumbed in parallel with the supply line for seal 56 so that flow across the seals is maintained in the event the seal oil supply pressure is temporarily interrupted as described below.

It will be understood that the use of four accumulators in the described system is not required from a technical standpoint, but may be desired and/or required as a redundancy feature. A single accumulator could be utilized to supply both seals, or one accumulator could be utilized to supply each seal, etc.

As already noted, under normal conditions, flow regulator valve 84 will maintain, for example, about an 8 psid across the seals 54, 56, sufficient to push pistons 16A–16D to the top of respective accumulators 10A–10D. Upon the occurrence of a transient event, at a time $t_1$, such as a mechanical failure of a single running pump $P_1$ or $P_2$, the sudden closing of pump isolation valve 64, or failure of the primary differential pressure regulating valve 84, the available system pressure drops to a lower value, depending on the failure mode. Flow to the seals is maintained during the transient, via discharge of accumulator pairs 10A, 10B and 10C, 10D, respectively, until the emergency pump is started or the differential pressure regulating valve 84 or (84A) assumes control. More specifically, when the seal differential pressure falls from the desired 8 psid to about 6 psid, the combined generator internal gas pressure and weight of pistons 16 will exceed the line pressure in conduits 86 and 88, thus causing the pistons 16A through 16D to descend within the respective accumulators 10A through 10D. As accumulators 10A and 10B discharge, seal oil will be supplied to the seals 54 via conduit 86, and as accumulators 10C and 10D discharge, seal oil will be supplied via conduit 88 to the seals 56. Cushion spears 28 will dampen the impact of the respective pistons as they reach a fully discharged position. In the example given, the accumulators 10A–10D will maintain about a 5½ psid across the seals 54, 56 until the accumulators are fully discharged at a time $t_2$, This differential is sufficient to maintain seal integrity until full pressure is restored. By time $t_2$, the backup pump $P_2$ (or emergency pump $P_3$) will be fully operational and the regulator valve 84 re-opened. The accumulators 10A–10D will then be recharged, causing the pistons 16A–16D to move upwardly in their respective accumulators 10A–10D. Any pressure spikes caused by movement of the pistons (if valve 84 not yet fully responsive upon re-opening) are dampened by the spring 26. Since valve 84 seeks to establish approximately 8 psid across the seals 54, 56, the valve will open wide during charging of the accumulators. During charging, the pressure difference across the valves is maintained at about 6½ psid and, after the accumulators are fully charged, the normal 8 psid is reestablished. At time $t_3$, the entire system is returned to normal operation. Under some circumstances, time $t_1$ to $t_3$ may be as little as 8 seconds, but the specific response times (as well as pressure difference levels) will depend on numerous factors as determined by specific applications, hardware, etc.

By utilizing generator gas pressure feedback (along with the weight of the pistons 16), the accumulators maintain the desired pressure differential across the generator seals without the need for operator adjustment when the generator pressure is varied.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A differential pressure accumulator for use in an oil supply system and adapted to temporarily supply oil to a destination during a transient event, the accumulator comprising a barrel having an inlet at one end and an outlet at the other end; a piston slidably received within said barrel to provide upper and lower chambers on opposite sides of said piston, wherein said piston comprises a body portion extending more than one half the length of the piston, and a plurality of axially aligned intermediate disks extending substantially the remaining length of the piston, said body portion and said plurality of axially aligned intermediate disks being sandwiched between a pair of end disks, wherein said body portion, plurality of axially aligned disks and end disks have substantially identical diameters, and further wherein weight and length of the piston can be altered by addition or removal of one or more of said axially aligned intermediate disks.

2. The accumulator of claim 1 wherein said piston body portion includes an annular seal separating said upper and lower chambers.

3. The accumulator of claim 2 wherein said piston incorporates a bypass around said seal to enable gas to pass from said lower chamber to said upper chamber upon filling said lower chamber with liquid via said inlet.

4. The accumulator of claim 1 where each of said body portion, plurality of axially aligned intermediate disks and end disks includes an annular wear ring in an external peripheral surface thereof to facilitate sliding motion of said piston within said barrel.

5. The accumulator of claim 1 wherein cushioning means are provided within said barrel on either side of said piston.

6. A differential pressure accumulator for use in an oil supply system and adapted to temporarily supply oil to a destination during a transient event, the accumulator comprising a barrel having an inlet at one end and an outlet at the other end; a piston slidably received within said barrel to provide upper and lower chambers on opposite sides of said piston, wherein said piston comprises a body portion and a plurality of axially aligned disks, said body portion and said axially aligned disks having substantially identical diameters and each has an annular wear ring on a peripheral surface thereof, adapted to facilitate sliding motion of said piston within said barrel.

7. The accumulator of claim 6 and wherein said body portion and said plurality of axially aligned disks are sandwiched between a pair of end disks.

8. The accumulator of claim 7 wherein said end disks each have an annular wear ring adapted to facilitate sliding motion of said end disks within said barrel.

9. The accumulator or claim 6 wherein said piston body portion includes an annular seal separating said upper and lower chambers, and wherein said piston incorporates a bypass around said seal to enable gas to pass from said lower chamber to said upper chamber upon filling said lower chamber with liquid via said inlet.

10. The accumulator of claim 1 wherein said body portion includes an annular wear ring in an external peripheral surface thereof to facilitate sliding motion of said piston within said barrel.

* * * * *